(12) United States Patent
Mleczko et al.

(10) Patent No.: US 7,425,234 B2
(45) Date of Patent: *Sep. 16, 2008

(54) IRON OXIDE PIGMENTS

(75) Inventors: Leslaw Mleczko, Dormagen (DE); Ulrich Meisen, Kall (DE); Georg Lamp, Leverkusen (DE); Ralph Weber, Leichlingen (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/547,726

(22) PCT Filed: Mar. 4, 2004

(86) PCT No.: PCT/EP2004/002177

§ 371 (c)(1),
(2), (4) Date: Sep. 29, 2006

(87) PCT Pub. No.: WO2004/083317

PCT Pub. Date: Sep. 30, 2004

(65) Prior Publication Data

US 2007/0051276 A1    Mar. 8, 2007

(30) Foreign Application Priority Data

Mar. 17, 2003   (DE) ................................ 103 11 549

(51) Int. Cl.
*C09C 1/24* (2006.01)
*C09C 3/00* (2006.01)
*C01G 49/02* (2006.01)

(52) U.S. Cl. .................... 106/456; 106/460; 106/712; 162/162; 423/632; 423/633; 502/325

(58) Field of Classification Search ........... 106/456, 106/460, 712; 423/632, 633; 502/325; 162/162
See application file for complete search history.

(56) References Cited

U.S. PATENT DOCUMENTS

| 5,421,878 A | 6/1995 | Lerch et al. ............ 106/456 |
| 5,911,967 A | 6/1999 | Ruthner ................. 423/632 |
| 6,179,908 B1 | 1/2001 | Braun et al. ............ 106/456 |
| 6,503,315 B1 | 1/2003 | Etzenbach et al. ....... 106/456 |

FOREIGN PATENT DOCUMENTS

DE    199 17 786    11/2000

OTHER PUBLICATIONS

Kladnig, W. & Karner, W.; cfi/Ber DKG 67 (1990), 80 "Production of oxide raw materials for the ceramic industry" pp. 80-84 [no month].
G. Buxbaum (ED.): "Industrial Inorganic Pigments" 1998, Wiley VCH, Weinheim, XP002289707 Seite 91, Absatz 3.1.1.4 [no month].

*Primary Examiner*—Anthony J Green
(74) *Attorney, Agent, or Firm*—Nicanor A. Kohncke

(57) ABSTRACT

The invention relates to iron oxide pigments comprising an average solid body diameter of 0.1 to 500 μm, and to the production and use thereof.

23 Claims, 1 Drawing Sheet

IRON OXIDE PIGMENTS

The invention relates to red iron oxide pigments having a mean solids diameter of 0.1 to 500 μm and to their preparation and their use.

There are various processes for the preparation of iron oxide pigments:

a) Laux Process

The Laux process starts from nitrobenzene and Fe metal and leads initially to iron oxide black or iron oxide yellow and aniline. In order to prepare iron oxide red by this process, the iron oxide black obtained is calcined. The process is very complicated and is not easy to master since variable proportions of control chemicals have to be used in order to establish the desired particle size. Moreover, the required apparatus technology is demanding and correspondingly expensive. Furthermore, aniline forms as a second product under reaction and, owing to its properties, necessitates particular occupational hygiene measures.

A disadvantage of the iron oxide red prepared by the Laux process is that the iron oxide red has a tendency to flocculate in the finish and to agglomerate. Furthermore, the iron oxide red prepared by the Laux process produces dust and has a high DIN pH value (6).

b) Precipitation Process

The preparation of iron oxide red by a direct precipitation process is described in U.S. Pat. No. 5,421,878. The direct precipitation process is difficult in terms of process engineering since $\alpha\text{-}Fe_2O_3$ is obtainable only in a narrow range and the reaction is not easy to master. The iron oxide red prepared by the precipitation process has the disadvantage of high salt loads which pollute the wastewater and are therefore ecologically unsafe.

Apart from high production costs, the iron oxide reds prepared by the precipitation process furthermore have the disadvantage that they produce dust and have a high DIN pH value (4.5 to 6).

c) Hydrothermal Process

The hydrothermal process is described in DE-A-19917786. Iron oxide red pigments for high-quality applications, in particular for paints and finishes, can be prepared by the hydrothermal process. However, the high process costs due to the pressure technique have a disadvantageous effect here. This process is therefore not suitable for simple applications in which economical products are required.

Apart from high production costs, the iron oxide red pigments prepared by the hydrothermal process furthermore have the disadvantage that they produce dust.

d) Penniman-Zoph Process

The Penniman-Zoph process is described in DE-A-19958168. According to the Penniman-Zoph process, iron oxide red pigments are prepared by dissolving iron metal with addition of an iron oxide red nucleus and oxidizing it. Here, as a rule nitric acid is used for producing the nucleus, so that nitrate or ammonia is present in the wastewater and has to be removed by means of complicated process engineering. As in the hydrothermal process and in the precipitation process, this leads to high production costs which limit the application of such pigments to a few fields.

Apart from an expensive and environmentally polluting preparation process, the iron oxide reds prepared by the hydrothermal process furthermore have the disadvantage that they produce dust and have a high DIN pH (4.5 to 6).

e) Calcination of Iron-Containing Materials

The calcination of iron-containing materials is described in EP-A-0 911 369. Iron oxide red can be prepared by calcining iron oxide yellow, iron oxide black or other iron-containing acidic or metallic solids. Owing to the high temperatures required, the quality of the iron oxide red pigments prepared therefrom suffers. In order to prepare high-quality iron oxide red pigments, high-quality precursor compounds are therefore required and make the process more expensive.

The iron oxide red pigments prepared by calcining iron-containing materials furthermore have the disadvantage that they are relatively hard and have to be milled by a complicated procedure. Furthermore, the iron oxide reds prepared by calcining iron-containing materials produce dust.

f) Decomposition of $FeSO_4$

The decomposition of iron(II) sulfate at high temperatures leads to iron oxide red and $SO_2$, which can be reacted to give sulfuric acid. Owing to the high temperatures required and the corrosiveness of the gases formed, this process requires high expenditures on apparatus technology.

Apart from the disadvantages of the preparation process which are described above, the iron oxide reds prepared by decomposing $FeSO_4$ furthermore have the disadvantage that they produce dust.

For many applications in the area of the coloring of concrete parts, emulsion paints and paper coloring, granules are now used since they produce little dust, and are flowable and readily dispersible. In the customary granulation processes, powders are used as starting materials and are mixed with a binder and then granulated. Customary granulation processes are spray granulation, press granulation and pan granulation.

g) Pyrohydrolysis of $FeCl_2$ or $Fe(NO_3)_2$

Pyrohydrolysis has been developed to industrial maturity since about 1960 and initially served mainly for recovering HCl from pickling solutions ($FeCl_2$). In the meantime, it has become an important process for obtaining oxide raw materials, in particular iron oxides. Advantages of this process are that it can be operated continuously, uses liquid raw materials, is economical and uses no byproducts and process chemicals and is therefore particularly environmentally friendly.

This process is widely used in the metallurgical industry. The main product here is the recovered hydrochloric acid (in some cases also hydrofluoric acid or nitric acid), which is reused for pickling steel. Iron oxide forms as a byproduct and is initially fed back to the blast furnace. By special purification steps for the pickle ($FeCl_2$ solution), it is possible to prepare pure iron oxides for the ferrite industry. In the case of this application, an exactly defined chemical composition which is as constant as possible and a low degree of impurities are required. Relatively hard-sintered oxides having as low a chloride content as possible are required. The specific surface area (determined according to the BET method) is usually 3-5 $m^2/g$, depending on the reaction temperature of the decomposition. In individual cases, BET surfaces areas of 10 $m^2/g$ can also be achieved. The process is described in detail in articles and patents (Kladnig, W. & Karner, W.; cfi/Ber DKG 67 (1990), 80; EP-A-0 850 881).

Owing to the low specific surface area of such products, they are not suitable for high-quality pigment applications since they have an undesired blue tinge. Customary commercially available iron oxide red pigments prepared by the pyrohydrolysis process have BET surface areas between 2 and 5.5 $m^2/g$ (company brochure Bailey-PVS Oxides L.L.C.; company brochure Thyssen Krupp Stahl 05/2000 [Thyssen Krupp Steel 05/2000]). Owing to their low specific surface area, these products, too, have a blue tinge and are therefore not suitable for high-quality pigment applications.

It was the object of the invention to prepare a low-dust, free-flowing red iron oxide pigment which has good color properties, i.e. no blue tinge, even without a binder.

The invention relates to iron oxide pigments having L*, a* and b* values, measured in the lightened tone according to CIELAB units, of L*=58 to 62, in particular 59 to 61,
a*=20 to 27, in particular 24 to 27,
b*=10 to 24, in particular 10 to 17, and having an iron oxide content greater than 99% by weight, based on the pigment, and a mean solids diameter of 0.1 to 500 µm.

In the context of this Application, "solids" are understood as meaning spheres. A photograph of the solids according to the invention is shown in FIG. 1.

The solids of the iron oxide pigments preferably have a BET surface area of 6.0 to 12.0 m²/g.

The solids of the iron oxide pigments consist of primary particles which preferably have a mean size of 0.05 to 0.5, preferably of 0.1 to 0.3, µm. The primary particles are likewise part of the invention.

The iron oxide pigment preferably has a DIN pH of 2.5 to 4.5, preferably of 3.1 to 3.8.

It is also preferable if the chloride content is 0.1% by weight or less, based on the pigment.

The invention furthermore relates to an iron oxide pigment having L*, a* and b* values, measured in the lightened tone according to CIELAB units, of L*=58 to 62, in particular 59 to 61,
a*=20 to 27, in particular 24 to 27,
b*=10 to 24, in particular 10 to 17, and having an iron oxide content greater than 99%, based on the pigment, the iron oxide pigment consisting of primary particles which have a mean size of 0.05 to 0.5, in particular 0.1 to 0.3, µm.

The iron oxide pigment preferably has a DIN pH of 2.5 to 4.5, preferably of 3.1 to 3.8.

The abovementioned iron oxide pigment preferably has a chloride content of 0.1% by weight or less, based on the pigment.

The invention furthermore relates to a process for the preparation of the iron oxide pigments according to the invention, characterized in that drops of an aqueous iron chloride solution are completely dewatered in order to form solids, which are subsequently calcined.

In the context of this Application, "calcination" is understood as meaning the thermal decomposition of the iron chloride solution according to one of the following equation:

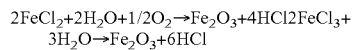

$2FeCl_2 + 2H_2O + 1/2 O_2 \rightarrow Fe_2O_3 + 4HCl \; 2FeCl_3 + 3H_2O \rightarrow Fe_2O_3 + 6HCl$ The process according to the invention is preferably carried out in such a way that the iron chloride solution, in which iron chloride is present as $FeCl_2$ and/or $FeCl_3$, is sprayed into a reactor through an airless or binary nozzle so that drops having a mean diameter of 1 to 1000 µm, preferably of 1 to 150 µm, form.

The dewatering preferably takes place at a temperature of 80 to 300° C., preferably of 100 to 160° C. The dewatering can be produced, for example, in a reactor by combustion gases, electrical heating, microwave heating or electromagnetic waves.

The combustion gases can be fed cocurrently or countercurrently. The gas is preferably separated from the iron oxide pigment inside or outside the reactor and worked up to give hydrochloric acid solution.

The calcination is carried out at temperatures of 200 to 900° C., preferably of 650 to 750° C.

As an additional dechlorination step, the solids can be subjected to a thermal treatment at temperatures of 200 to 900° C. for residence times of 10 min to 6 h after the calcination. In addition, steam can be brought into contact with the solid during the thermal treatment.

The total residence time of the drops/solids at temperatures of more than 300° C. during the dewatering and calcination is preferably between 1 second and 90 minutes, preferably between 1 minute and 70 minutes.

In addition, after the calcination, the solids can be cooled and then washed with water.

All preparation steps can be carried out either in the same reactor or in different reactors.

The following reaction parameters are preferably established: The iron chloride solution having a content of 100 to 300 g/l of $FeCl_2$ is sprayed into a reactor through a nozzle, preferably a binary nozzle, cocurrently or countercurrently, preferably cocurrently, so that drops having a mean diameter between 1 and 1000 µm, preferably between 5 and 150 µm, form. The reaction temperature is set at 80 to 300° C. in the dewatering reactor. The reaction temperature in the dewatering reactor is preferably set at between 100° C. and 200° C., very particularly preferably between 120° C. and 160° C., so that the drops are dried in a gentle manner and very small solids comprising iron chloride crystals having a narrow particle size distribution are obtained. Hot combustion gases are preferably used for heating.

The solids are then calcined at temperatures between 200° C. and 900° C., preferably between 500° C. and 850° C., particularly preferably between 650° C. and 750° C., with formation of iron oxide and gaseous hydrochloric acid. Hot combustion gases are preferably used for heating.

The dewatering and the calcination can be carried out in two separate reactors or can be integrated in one reactor. Owing to the finely divided character, the solids are separated off inside or outside the reactor using a cyclone and/or using suitable filter media, in the temperature range between 150° C. and 900° C., preferably between 500° C. and 850° C., particularly preferably between 650° C. and 750° C. In order to minimize the chloride content and establish the primary particle distribution and color properties, a thermal aftertreatment at temperatures between 200 and 900° C. and for a residence time between 10 minutes and 6 hours can be carried out separately or in the same reactor after the calcination. In addition, steam can be fed in in this process stage.

The preparation process gives yellow-red iron oxide pigments which are suitable for a broad spectrum of use. These iron oxide pigments can furthermore be prepared in the absence of a binder in the context of the invention. Solids are obtained by the process according to the invention. The majority of the solids are obtained in the form of spheres.

For some applications, particularly in the paint and finish sector, finely milled powders are required. The solids can therefore subsequently be milled after the calcination until a mean size of 0.05 to 0.5, preferably 0.1 to 0.3, µm is reached. The milling apparatus used is preferably a jet mill, a pendulum roller mill or a mechanical classifier mill.

The invention furthermore relates to the use of the iron oxide pigments according to the invention in the construction sector, for paints and finishes, as raw material for the production of hard and soft ferrites, for the production of catalysts, for coloring paper and for use in colored substances in food and/or in the cosmetics sector.

In the context of the present invention, applications in the construction sector are understood as meaning applications in renders, paving stones, mortar mixtures, etc. The iron oxide pigment formed in the reactor can furthermore be filled and used directly after cooling.

The iron oxide pigments according to the invention can be used as solids directly in the construction sector and/or for the production of catalysts.

For some applications, finely milled powders are required The iron oxide pigments according to the invention can therefore be used as primary particles in the construction sector, for paints and finishes, as raw material for the production of hard and soft ferrites, for the production of catalysts, for coloring paper and for use in colored substances in food and/or in the cosmetics sector.

The present invention is described herein with reference to specific details of particular embodiments and examples thereof. It is not intended that such details be regarded as limitations upon the scope of the invention except insofar as and to the extent that they are included in the accompanying claims.

EXAMPLES

Experimental Arrangement

Figure 1:
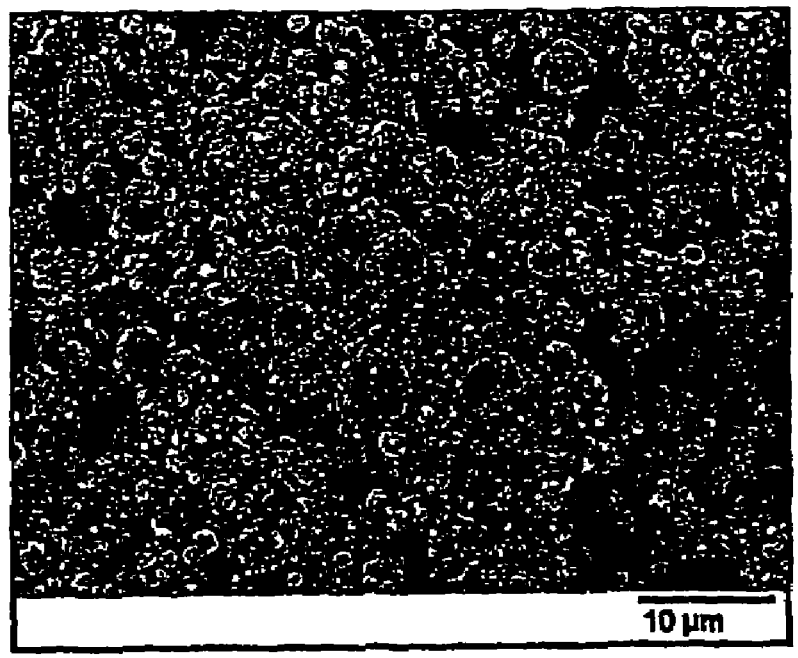
FIG.1 illustrates the solids according to at least one embodiment of the invention.
Figure 1:

The measurement of the lightened tone (color strength) of the particles obtained is effected as stated in EP-A-911 369, page 6, line 9 to page 7, line 26.

The particle size was determined from transmission electron micrographs (primary particles) or scanning electron micrographs (solids).

The determination of the metallic secondary components was effected by ICP-OES. ICP-OES is a method for determining elements which are present in low concentration in an aqueous sample. It is a spectroscopic method in which the element to be determined is excited and the emitted light of the transition to the ground state, which is characteristic of each element, is measured (OES=optical emission). The excitation is effected here by means of a plasma burner (ICP=inductive cuppled plasma). The limit of detection of the method of determination is 5 µg/kg.

The determination of the chloride content was determined argentometrically with potentiometric endpoint determination The limit of detection of the method of determination is 50 mg/kg.

The measurement of the pH of the powder is effected in a suspension in demineralized water according to DIN-EN-ISO 787-9.

The high-quality iron oxide pigment Bayferrox® 130 from Bayer AG was used as a comparative substance.

Example 1

In a 2-stage, electrically heated DN100 spray roasting reactor, an aqueous iron(II) chloride solution having a concentration of 200 g/l of FeCl2 was sprayed into the reactor at room temperature. The throughput was 0.24 l of solution per hour and the spray pressure at the binary nozzle was 2 bar. The temperature and residence time in the dewatering section were accordingly 110° C. and 12 s. In the calcination section, the temperature and the residence time were set to 500° C. and 7 s. After convection cooling to temperatures between 150° C. and 200° C., the resulting solids were separated from the gas in a textile filter comprising PTFE needle felt.

The material separated off was subjected to thermal aftertreatment at a temperature of 750° C. for 60 min in a muffle furnace. The total residence time at temperatures of more than 300° C. was therefore 60 min 7 s. Solids having a mean solids diameter of 4.5 µm formed. The mean diameter of the primary particles was 0.1 µm.

The end product had the following properties:
L*: 60.0 (lightened tone)
a*: 26.7 (lightened tone)
b*: 16.4 (lightened tone)
Cl content: 0.03% by weight
BET surface area: 8.9 $m^2/g$
DIN pH: 3.3
Color strength: 105% against Bayferrox® 130

Example 2

In a 2-stage, electrically heated DN100 spray roasting reactor, an aqueous iron(II) chloride solution having a concentration of 200 g/l of FeCl2 was sprayed into the reactor at room temperature. The throughput was 0.24 l of solution per hour and the spray pressure at the binary nozzle was 2 bar. The temperature and residence time in the dewatering section were accordingly 150° C. and 37 s. In the calcination section, the temperature and the residence time were set to 700° C. and 16 s. After convection cooling to temperatures between 150° C. and 200° C., the resulting solids were separated from the gas in a textile filter comprising PTFE needle felt.

The material separated off was subjected to thermal aftertreatment at a temperature of 750° C. for 60 min in a muffle furnace. The total residence time at temperatures of more than 300° C. was therefore 60 min 16 s. Solids having a mean solids diameter of 11.6 µm formed. The mean diameter of the primary particles was 0.1 µm.

The end product had the following properties:
L*: 60.6 (lightened tone)
a*: 26.3 (lightened tone)
b*: 15.3 (lightened tone)
Cl content: 0.02% by weight
BET surface area: 8.7 $m^2/g$
DIN pH: 4.3
Color strength: 99% against Bayferrox® 130

Example 3

In a 2-stage, electrically heated DN100 spray roasting reactor, an aqueous iron(II) chloride solution having a concentration of 300 g/l of FeCl2 was sprayed into the reactor at room temperature. The throughput was 0.24 l of solution per hour and the spray pressure at the binary nozzle was 2 bar. The temperature and residence time in the dewatering section were accordingly 125° C. and 15 s. In the calcination section, the temperature and the residence time were set to 700° C. and 6 s. After convection cooling to temperatures between 150° C. and 200° C., the resulting solids were separated from the gas in a textile filter comprising PTFE needle felt.

The material separated off was subjected to thermal aftertreatment at a temperature of 750° C. for 60 min in a muffle furnace. The total residence time at temperatures of more than 300° C. was therefore 60 min 6 s. Solids having a mean solids diameter of 7.6 µm formed. The mean diameter of the primary particles was 0.1 µm.

The end product had the following properties:
L*: 60.8 (lightened tone)
a*: 26.4 (lightened tone)
b*: 15.7 (lightened tone)
Cl content: 0.01% by weight
BET surface area: 9.2 m²/g
DIN pH: 3.7
Color strength: 97% against Bayferrox® 130

Overview of the examples

|  | Examples | | |
| --- | --- | --- | --- |
|  | 1 | 2 | 3 |
| Dewatering in ° C. | 110 | 150 | 125 |
| Calcination in ° C. | 500 | 700 | 700 |
| Dewatering time in s | 12 | 37 | 15 |
| Calcination time in s | 7 | 16 | 6 |
| Thermal treatment in ° C. | 750 | 750 | 750 |
| Thermal treatment time in min | 60 | 60 | 60 |
| Total residence time >300° C. in min:s | 60:07 | 60:16 | 60:06 |
| Mean diameter of the solids in µm | 4.5 | 11.6 | 7.6 |
| Mean diameter of the primary particles in µm | 0.1 | 0.1 | 0.1 |
| L* | 60.0 | 60.6 | 60.8 |
| a* | 26.7 | 26.3 | 26.4 |
| b* | 16.4 | 15.3 | 15.7 |
| Cl content (% by weight) | 0.03 | 0.02 | 0.01 |
| BET (m²/g) | 8.9 | 8.7 | 9.2 |
| DIN pH | 3.3 | 4.3 | 3.7 |
| Color strength in % | 105 | 99 | 97 |

What is claimed is:

1. An iron oxide pigment comprising:
   solids, wherein an L*, a* and b* values of the iron oxide pigment, measured in a lightened tone according to CIELAB units, are
   L*=58 to 62,
   a*=20 to 27,
   b*=10 to 24; and
wherein a content of the iron oxide is greater than 99% by weight and a chloride content is less than 0.03 % by weight, based on the pigment, and the pigment has a mean solids diameter of 0.1 to 500 µm.

2. The iron oxide pigment according to claim 1, wherein the solids have a BET surface area of 6.0 to 12.0 m²/g.

3. The iron oxide pigment according to claim 1, wherein the solids comprise primary particles, said primary particles having a mean size of 0.05 to 0.5 µm.

4. The iron oxide pigment according to claim 1, wherein the iron oxide pigment has a DIN pH of 2.5 to 4.5.

5. A process for the preparation of the iron oxide pigment as according to claims 1, comprising:
   dewatering drops of an iron chloride solution thereby forming the solids; and
   calcining the solids thereby reducing the chloride content of the solids.

6. The process according to claim 5, wherein the iron chloride of the iron chloride solution comprises ferrous chloride (FeCl2) and/or ferric chloride (FeCl3).

7. The process according to claim 5, wherein the drops have a mean diameter of 1 to 1000 µm.

8. The process according to claim 5, wherein the dewatering takes place at a temperature of 80 to 300° C.

9. The process according to claim 5, wherein the calcining is carried out at temperatures of 200 to 900° C.

10. The process according to claim 5, further comprising: thermally treating the solids, after the dewatering and the calcining, at temperatures of 200 to 900° C. for residence times of 10 minutes to 6 hours.

11. The process according to claim 5, wherein the dewatering takes place at a temperature of 80 to 300° C.; the calcining is carried out at temperatures of 200 to 900° C.; and the total residence time of the solids at temperatures of more than 300° C. during the dewatering and calcining steps is between 1 second and 90 minutes.

12. The process according to claim 5, further comprising: cooling the solids after the calcining step; and washing the solids with water.

13. The process according to claim 5, wherein the dewatering and calcining steps are carried but in the same reactor.

14. The process according to claims 5, further comprising: milling the solids, after the calcining step using a jet mill, a pendulum roller mill or a mechanical classifier mill, until a mean size of 0.05 to 0.5 µm is reached.

15. The process according to claim 10, wherein the step of thermally treating the solids comprises bringing steam into contact with the solids.

16. A process for the preparation of a construction sector material comprising: admixing the iron oxide pigment of claim 1 with the construction sector material, wherein said construction sector material comprises renders, paving stones, and mortar mixtures.

17. A process for the preparation of a paint or finish comprising: admixing the Iron oxide pigment of claim 1 with the paint or finish.

18. A process for the preparation of a hard or soft ferrite comprising: admixing the iron oxide pigment of claim 1 with the hard or soft ferrite.

19. A process for the preparation of a catalyst comprising; admixing the iron oxide pigment of claim 1 with the catalyst.

20. A process for the preparation of a colored paper comprising: contacting the iron oxide pigment of claim 1 with the colored paper.

21. A process for the preparation of a colored substance comprising: contacting the iron oxide pigment of claim 10 with the colored substance.

22. An iron oxide pigment comprising:
   primary particles, said primary particles having a mean size of 0.05 to 0.5 µm;
   further wherein an L*, a* and b* values of the iron oxide pigment, measured in a lightened tone according to CIELAB units, are
   L*=58 to 62,
   a*=20 to 27,
   b*=10 to 24, and
   wherein the iron oxide pigment has an iron oxide content greater than 99% by weight and a chloride content is less than 0.03% by weight, based on the pigment.

23. The iron oxide pigment according to claim 22, wherein the iron oxide pigment has a pH of 2.5 to 4.5.

* * * * *